United States Patent
Nakamura et al.

(10) Patent No.: US 7,903,206 B2
(45) Date of Patent: Mar. 8, 2011

(54) LIQUID CRYSTAL DISPLAY DEVICE AND PRODUCING METHOD THEREOF WITH REFLECTION AND TRANSMISSION DISPLAY AND A COLOR FILTER HAVING A COLOR REPRODUCTION RANGE

(75) Inventors: Kozo Nakamura, Kasihiba (JP); Shun Ueki, Nara (JP); Tokio Taguchi, Tenri (JP); Kazuhiko Tsuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 202 days.

(21) Appl. No.: 11/157,153

(22) Filed: Jun. 21, 2005

(65) Prior Publication Data

US 2005/0285996 A1 Dec. 29, 2005

(30) Foreign Application Priority Data

Jun. 23, 2004 (JP) ................... 2004-185201
Mar. 23, 2005 (JP) ................... 2005-083472

(51) Int. Cl.
*G02F 1/1335* (2006.01)
(52) U.S. Cl. ........................... 349/106; 349/114
(58) Field of Classification Search .......... 349/114, 349/106
See application file for complete search history.

(56) References Cited

U.S. PATENT DOCUMENTS

| | | | | |
|---|---|---|---|---|
| 5,216,531 A * | 6/1993 | Hirai et al. | | 349/93 |
| 5,619,280 A * | 4/1997 | Yamashita et al. | | 348/645 |
| 5,671,031 A * | 9/1997 | Nakamura et al. | | 349/106 |
| 6,215,538 B1 | 4/2001 | Narutaki et al. | | |
| 6,278,507 B1 | 8/2001 | Nakamura | | |
| 6,281,952 B1 | 8/2001 | Okamoto et al. | | |
| 6,452,654 B2 * | 9/2002 | Kubo et al. | | 349/114 |
| 6,456,347 B1 * | 9/2002 | Motomura et al. | | 349/117 |
| 6,552,764 B2 * | 4/2003 | Fujioka et al. | | 349/106 |
| 6,624,860 B1 | 9/2003 | Narutaki et al. | | |
| 6,785,068 B2 * | 8/2004 | Takizawa et al. | | 359/885 |
| 6,847,426 B2 | 1/2005 | Fujimori et al. | | |
| 6,850,298 B2 | 2/2005 | Fujimori et al. | | |
| 6,862,059 B2 * | 3/2005 | Murai et al. | | 349/114 |
| 6,893,781 B2 * | 5/2005 | Nonaka et al. | | 430/7 |

(Continued)

FOREIGN PATENT DOCUMENTS

JP 10-339871 A 12/1998

(Continued)

OTHER PUBLICATIONS

International Search Report mailed Nov. 8, 2005 in corresponding PCT application No. PCT/JP2005/011294.

(Continued)

*Primary Examiner* — Mark A Robinson
*Assistant Examiner* — Paisley L Arendt
(74) *Attorney, Agent, or Firm* — Nixon & Vanderhye P.C.

(57) ABSTRACT

An opposed substrate has a configuration in which a retardation film and a polarizer are provided outside a glass substrate, and a color filter is provided inside the glass substrate. The color filter selects a color of light passing through the color filter itself. The color filter has a color reproduction range of 0.079 or more both in a reflection area and in a transmission area. It is preferable that color filters are formed of the same color material and have almost the same thickness in a reflection area and a transmission area. That is, it is preferable that one pixel area has the same configuration in the reflection area as in the transmission area.

9 Claims, 7 Drawing Sheets

U.S. PATENT DOCUMENTS

| | | | |
|---|---|---|---|
| 6,909,479 B2* | 6/2005 | Iijima | 349/109 |
| 7,006,172 B2* | 2/2006 | Kawana et al. | 349/71 |
| 7,068,334 B2* | 6/2006 | Kojima et al. | 349/106 |
| 2003/0030767 A1* | 2/2003 | Takizawa et al. | 349/113 |
| 2003/0071942 A1* | 4/2003 | Kojima et al. | 349/106 |
| 2004/0051724 A1* | 3/2004 | Elliott et al. | 345/694 |
| 2005/0219443 A1* | 10/2005 | Tanaka et al. | 349/106 |

FOREIGN PATENT DOCUMENTS

| | | |
|---|---|---|
| JP | 2000-111902 A | 4/2000 |
| JP | 2001-56466 A | 2/2001 |
| JP | 2001-125094 A | 5/2001 |
| JP | 2001-183646 A | 7/2001 |
| JP | 2002-296582 A | 10/2002 |
| JP | 2002-365420 A | 12/2002 |
| JP | 2003-5175 A | 1/2003 |
| JP | 2003-121632 A | 4/2003 |
| JP | 2003-185830 A | 7/2003 |
| JP | 2003-294930 A | 10/2003 |
| JP | 2004-20648 A | 1/2004 |
| WO | WO 2004/025359 | 3/2004 |

OTHER PUBLICATIONS

International Search Report mailed Nov. 8, 2005 in corresponding PCT application No. PCT/JP2005/011294.

* cited by examiner

LIQUID CRYSTAL DISPLAY DEVICE AND PRODUCING METHOD THEREOF WITH REFLECTION AND TRANSMISSION DISPLAY AND A COLOR FILTER HAVING A COLOR REPRODUCTION RANGE

REFERENCE TO RELATED APPLICATION

This Nonprovisional application claims priority under 35 U.S.C. §119(a) on Patent Application No. 2004-185201 filed in Japan on Jun. 23, 2004 and Patent Application No. 2005-083472 filed in Japan on Mar. 23, 2005, the entire contents of which are hereby incorporated by reference.

BACKGROUND OF THE INVENTION

1. Field of the Invention

The present invention relates to a liquid crystal display device displaying images by both reflection display and transmission display, and a producing method thereof.

2. Description of the Related Art

Currently, liquid crystal display devices are used widely in electronic apparatuses such as a monitor, a projector, a mobile phone and a Personal Digital Assistant (hereinafter referred to as a "PDA"). Such a liquid crystal display device includes a reflection type, a transmission type and a transflective type.

A reflection type liquid crystal display device is configured so as to obtain reflection display by guiding surrounding light into an inside of a liquid crystal panel and reflecting the light by use of a reflective layer. Furthermore, a transmission type liquid crystal display device is configured so as to obtain transmission display by emitting light from a light source provided on a rear face side of a liquid crystal panel (hereinafter, explanation is given for a backlight as an example) to an outside via the liquid crystal panel.

Furthermore, in a transflective type liquid crystal display device, reflection display is hardly recognized in environment, where there is little surrounding light, such as nighttime, and therefore, only transmission display is observed substantially. In environment, where surrounding light is fluorescent lighting, such as indoor (hereinafter referred to as an "indoor environment"), reflection display using surrounding light and transmission display using light irradiated from a backlight are observed. Furthermore, in environment, where surrounding light is sunlight, such as outdoor (hereinafter referred to as an "outdoor environment"), it is difficult to recognize transmission display, and therefore, reflection display using the surrounding light is mainly observed. Thereby, it is possible to recognize display irrespective of surrounding brightness. That is, transflective type liquid crystal display devices are installed in mobile apparatuses such as a mobile phone, a PDA or a digital camera, since they are capable of displaying in any environment, both indoor and outdoor.

In such a transflective type liquid crystal display device, a liquid crystal panel has two kinds of display areas, that is, a reflection area used for reflection display and a transmission area used for transmission display. In the transmission area, light irradiated from a backlight passes through a color filter only once and is emitted to an outside. On the other hand, in the reflection area, surrounding light after passing through the color filter is reflected by a reflective layer, and passes the color filter again to be emitted to an outside. As described above, the number of times in which light passes through a color filter is different between the transmission area and the reflection area.

As a configuration of a color filter in such a transflective type liquid crystal display device, there is one, as a first method, that color filters of the same color material and the same thickness are simply formed in the reflection area and the transmission area respectively, as described in Japanese Kokai Publication 2000-111902 and Japanese Kokai Publication 2001-183646 as previous arts. In this configuration, however, reflection display becomes dark when a color filter securing a color reproduction range suitable for transmission display are used, since light passes through the color filter in a reflection area twice as described above. To cope with this problem, there is proposed the following method.

A second method is, as described in Japanese Kokai Publication 2000-111902, one in which a color filter of the same color material and the same thickness as that formed in a transmission area is formed in a reflection area and an unpigmented area is provided in the reflection area, whereby reflection display becomes bright even though the color filter is formed so as to have a color reproduction range suitable for transmission display.

A third method is, as described in Japanese Kokai Publication 2001-183646, one in which a color filter suitable for reflection display is formed in a reflection area, and a color filter suitable for transmission display is formed in a transmission area to thereby form a color filter having a color reproduction range suitable for the transmission display and make the reflection display bright.

A forth method is, as described in Japanese Kokai Publication 2002-296582, one in which a color filter in a reflection area is formed so as to be made of the same color material as that in a transmission area and have a film thickness thinner than that in the transmission area, to thereby make reflection display bright even though a color filter having a color reproduction range appropriate for transmission display is formed.

A color reproduction range of a color filter will be explained. In general, a color filter includes a plurality of filters corresponding to a plurality of primary colors, for example, three kinds of filters of red (R), green (G) and blue (B). In a liquid crystal display device, the amount of light passing through each of the filters of primary colors is adjusted independently, whereby various colors can be displayed.

In other words, a color of light emitted from the color filter is expressed by a color mixture of a plurality of primary colors. A color reproduction range of a color filter is an inside of a polygon obtained when chromaticity coordinates (x, y) of primary colors of light emitted from the color filter are shown on a chromaticity diagram of the CIE 1931 standard calorimetric system.

A color reproduction range of a color filter is defined as an area of the polygon calculated by using scales of a chromaticity diagram of the CIE 1931 standard colorimetric system. Therefore, a color obtained when the color reproduction range of a color filter is small has low color saturation. And, when the color reproduction range of a color filter is large, a color with high color saturation can be expressed, and therefore, display colors can be diversified. Furthermore, the larger the color reproduction range of a color filter becomes, the smaller the amount of light passing through the color filter becomes.

Both of the reflection display and the transmission display are observed in indoor environment. However, the second to fourth methods described above adopt a configuration that reflection display is made bright, and therefore display light emitted from the reflection area (hereinafter referred to as "reflection display light") has a smaller color reproduction range. That is, when an observer observes both of the reflection display and the transmission display, the observer feels that the display is brighter than that in the case of observing the transmission display only and that the color reproduction range of a liquid crystal display device is smaller than that in the case of observing the transmission display only. This is because, when both of the reflection display and the transmission display are observed, the observer recognizes both of the reflection display light and display light emitted from the transmission area (hereinafter referred to as "transmission display light"), and because a color mixture of the reflection display light and the transmission display light is recognized as the color reproduction range of the liquid crystal display device.

Therefore, in the case where surrounding light is not so bright, reflection display light is little recognized, and therefore transmission display light is mainly recognized, and a difference in a color reproduction range of a liquid crystal display device is hardly recognized as compared with the case of observing transmission display only. However, as the surrounding light becomes brighter, the reflection display light is gradually recognized, and the color reproduction range of a liquid crystal display device is recognized differently as comparing with the case of observing the transmission display only.

On the other hand, in outdoor environment, both of the reflection display and the transmission display are observed. However, since the surrounding light is brighter, the reflection display light is mainly recognized and the transmission display light is little recognized. Since the reflection display light has a smaller color reproduction range as described above, the color reproduction range of a liquid crystal display device is different from that in the case of observing the transmission display only.

As described above, the color reproduction range of a liquid crystal display device is largely different between in the reflection display and in the transmission display, or from one environment of surrounding light to another.

A color reproduction range of a liquid crystal display device will be explained. A color reproduction range of a liquid crystal display device is a color reproduction range visually recognized by an observer when the observer actually observes a liquid crystal display device. That is, similar to the color reproduction range of a color filter, a color reproduction range of a liquid crystal display device is an inside of a polygon obtained when chromaticity coordinates (x, y) of primary colors of reflection display light or transmission display light are shown on a chromaticity diagram of the CIE 1931 standard calorimetric system. The color reproduction range of a liquid crystal display device is defined as an area of the polygon calculated by using scales of a chromaticity diagram of the CIE 1931 standard colorimetric system. Therefore, a color obtained when the color reproduction range of a liquid crystal display device is small, has low color saturation, and when the color reproduction range of a liquid crystal display device is large, a color with high color saturation can be expressed, and display colors can be diversified.

Furthermore, the color filter manufactured by the first method is considered as inappropriate for a transflective type liquid crystal display device by the following reasons. The color reproduction range of a color filter in the reflection area and that in the transmission area are same, but the color reproduction range of a liquid crystal display device becomes larger in the reflection display than that in the transmission display, in other words, the reflection display becomes dark, since the number of times light passes through the color filter is different between in the reflection display and in the transmission display.

The color reproduction range of a liquid crystal display device naturally differs between in the reflection display and in the transmission display.

In this way, in the first to fourth methods, the color reproduction range of a liquid crystal display device differs between in the reflection display and in the transmission display. The difference in the color reproduction ranges is not a large problem for display such as graphic display and character display in which colors is not important. However, in recent years, since there arises a necessity for performing delicate color image display such as TV image of natural picture or photograph in a mobile apparatus, the difference gradually becomes a major problem.

SUMMARY OF THE INVENTION

The present invention is made in view of the above-mentioned previous problems. An object of the present invention is to provide a liquid crystal display device capable of reducing a difference in color reproduction ranges of a liquid crystal display device between when the liquid crystal display device performs reflection display and when the liquid crystal display device performs transmission display, and a preferable producing method thereof.

In order to achieve such an object, the liquid crystal display device of the present invention is a liquid crystal display device for performing reflection display and transmission display, the device comprising, a color filter including filters of n colors which are at least three colors, the color filter having a color reproduction range of 0.079 or more, the color reproduction range, when light of n colors after passing through the filters of n colors is shown as chromaticity coordinates (x, y) of n points on a chromaticity diagram of a CIE 1931 standard calorimetric system under conditions of a $D_{65}$ light source and a visual field of 2°, being defined by an area of a polygon having the n points as vertexes, the color filter being used for both of the reflection display and the transmission display.

Furthermore, a liquid crystal display device of the present invention is a liquid crystal display device in which a reflection area for performing reflection display and a transmission area for performing transmission display are formed in one pixel area, the device comprising a color filter including filters of n colors which are at least three colors, the filters of n colors including a filter of one color formed corresponding to each of a plurality of pixels, the filter of one color corresponding to one pixel and having a same configuration in the reflection area as in the transmission area, the color filter having a color reproduction range of 0.079 or more, the color reproduction range, when light of n colors after passing through the filters of n colors is shown as chromaticity coordinates (x, y) of n points on a chromaticity diagram of a CIE 1931 standard calorimetric system under conditions of a $D_{65}$ light source and a visual field of 2°, being defined by an area of a polygon having the n points as vertexes.

Furthermore, the present invention also provides a method for producing the liquid crystal display device, comprising a step of forming a filter of one color among filters of n colors constituting a color filter in a transmission area, and a filter of the same color constituting a color filter in a reflection area as the filter of one color.

The liquid crystal display device of the present invention can make a value calculated by dividing a color reproduction range of the liquid crystal display device in reflection display by a color reproduction range of the liquid crystal display device in transmission display (hereinafter referred to as "color reproduction range ratio of liquid crystal display device"), close to 1.00. Therefore, even though either the reflection display or the transmission display is mainly observed, an observer hardly feels a difference in the color reproduction range of the liquid crystal display device.

The lower limit of the color reproduction range of the color filter is preferably 0.095.

Furthermore, in order to effectively obtain operation and effect of the present invention, a difference in color reproduction ranges between of the color filter in the reflection area and of the color filter in the transmission area is preferably 0.007 or less.

Furthermore, in the liquid crystal display device of the present invention, when the color filters have the same configuration in the transmission area as in the reflection area respectively, that is, have the same color material and almost the same film thickness, a forming process of the color filter can be simplified comparing with the case of providing color filters of different configurations in the reflection area and the transmission area respectively. Therefore, it is possible to reduce producing costs.

When the color reproduction range of the color filter is enlarged too much, amount of light passing through the color filter is reduced. Therefore, the upper limit of the color reproduction range of the color filter is preferably 0.140 or less, and more preferably, 0.130.

In order to obtain operation and effect of the present invention more effectively, it is preferable that the liquid crystal display device has a contrast ratio of 100 or more when performing the transmission display, and has a contrast ratio of 20 or more but 50 or less when performing the reflection display.

Comparing the case where the contrast ratio is 100 with the case where the contrast ratio is 300, for example, the color reproduction ranges of the liquid crystal display differ a little, but the difference is small. Therefore, in the present invention, the color reproduction range of the liquid crystal display device can be considered as constant when the contrast ratio is 100 or more. In the case where the color reproduction range of the color filter is 0.130, the contrast ratio when performing the transmission display is 100 or more, and the contrast ratio when performing the reflection display is 20, the color reproduction range ratio of the liquid crystal display device can be about 0.90, whereby the color reproduction range ratio of the liquid crystal display device can be made close to 1.00.

Furthermore, in a method for producing the liquid crystal display device of the present invention, a filter in the reflection area and a filter of the same color in the transmission area as the filter can be formed in the same step. Therefore, it is possible to simplify a forming process of color filter comparing with the case of forming them in separate steps.

As a preferable embodiment of a liquid crystal display device of the present invention (hereinafter referred to as "a first embodiment"), there is a liquid crystal display device, comprising:
    a backlight;
    a transmission electrode, disposed forward of the backlight (display side), for transmitting light from the backlight;
    a reflection electrode, disposed forward of the back light, for reflecting light made incident from a front face; and
    a color filter, disposed forward of the transmission electrode and the reflection electrode, for transmitting light passing through the transmission electrode, light made incident from the front face, and light reflected by the reflection electrode among the light made incident from the front face,
    the color filter having a color reproduction range of 0.079 or more,
    the color reproduction range, when light of n colors after passing through the filters of n colors is shown as chromaticity coordinates (x, y) of n points on a chromaticity diagram of a CIE 1931 standard calorimetric system under conditions of a $D_{65}$ light source and a visual field of 2°, being defined by an area of a polygon having the n points as vertexes. Since the color reproduction range of the color filter is 0.079 or more in the first embodiment, the color reproduction range ratio of the liquid crystal display device can be made close to 1.00.

In the first embodiment, the color filter may have different configurations between at a part used for the transmission display and at a part used for the reflection display.

Furthermore, as another preferable embodiment of a liquid crystal display device of the present invention (hereinafter referred to as "a second embodiment"), there is a liquid crystal display device comprising:
    a backlight;
    a semi-transmissive film, disposed forward of the backlight (display side), for transmitting light from the backlight and reflecting light made incident from a front face; and
    a color filter, disposed forward of the semi-transmissive film, for transmitting light passing through the semi-transmissive film, light made incident from the front face, and light reflected from the semi-transmissive film among the light made incident from the front face,
    the color filter having a color reproduction range of 0.079 or more,
    the color reproduction range, when light of n colors after passing through the filters of n colors is shown as chromaticity coordinates (x, y) of n points on a chromaticity diagram of a CIE 1931 standard calorimetric system under conditions of a $D_{65}$ light source and a visual field of 2°, being defined by an area of a polygon having the n points as vertexes. Since the color reproduction range of the color filter is 0.079 or more in the second embodiment, the color reproduction range ratio of the liquid crystal display device can be made close to 1.00.

As described above, in the present invention, it is possible to make the color reproduction range of the liquid crystal display device in the reflection display close to the color reproduction range of the liquid crystal display device in the transmission display. Thereby, the liquid crystal display device of the present invention can perform display keeping almost constant color reproduction ranges irrespective of the environment of the surrounding light. And such a liquid crystal display device can be obtained at low cost by a simple producing method.

Figure 1:
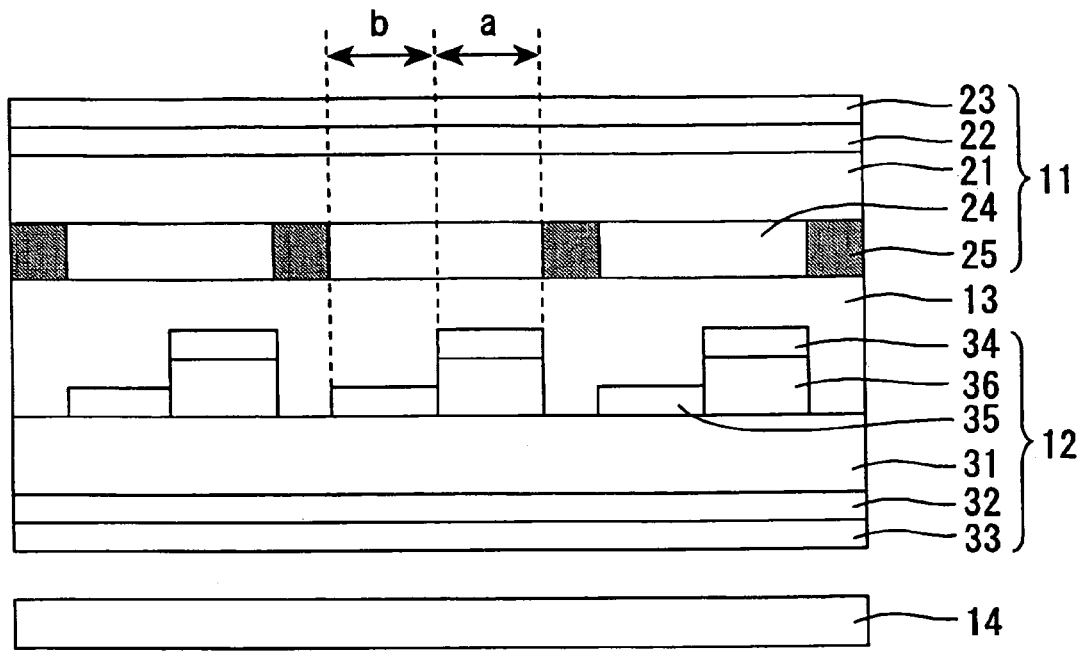
FIG. 1 is a cross-sectional view schematically showing a configuration of the liquid crystal display device according to the first embodiment of the present invention.

EXPLANATION OF NUMERALS AND SYMBOLS 11 opposed substrate
12 pixel substrate
13 liquid crystal layer
14 backlight
14a backlight (lighted state)
14b backlight (non-lighted state)
21 glass substrate
22 retardation film
23 polarizer
24 color filter
25 light shielding film
31 glass substrate
32 retardation film
33 polarizer
34 reflective electrode (reflective layer)
35 transparent electrode
36 resin film
40 glass substrate
41 filter
50 liquid crystal display device
51 light receiving unit
52 diffusion irradiation unit
a reflection area
b transmission area

DESCRIPTION OF THE PREFERRED EMBODIMENTS

An embodiment of the present invention will be explained. The liquid crystal display device according to the present embodiment is a device performing reflection display and transmission display.

First, a configuration of the liquid crystal display device will be explained. FIG. 1 is a cross-sectional view schematically showing a configuration of the liquid crystal display device according to the present embodiment.

As shown in FIG. 1, the liquid crystal display device has a configuration in which a liquid crystal layer 13 is interposed between an opposed substrate 11 and a pixel substrate 12. Furthermore, one pixel area includes a reflection area "a" and a transmission area "b" as shown in FIG. 1. The reflection area "a" is a pixel area used for reflection display, and the transmission area "b" is a pixel area used for transmission display.

As shown in FIG. 1, the opposed substrate 11 has a configuration in which a retardation film 22 and a polarizer 23 are provided outside a glass substrate 21, and a color filter 24 is provided inside the glass substrate 21. The retardation film 22 is for adjusting a polarized state of light passing itself. As the retardation film 22, one improving a contrast ratio in reflection display by being used with the polarizer 23 is preferable. For example, there is one in which a λ/4 retardation film, a λ/4 retardation film and a λ/2 retardation film are laminated such that the λ/2 retardation film is on the polarizer 23 side. The polarizer 23 transmits light of a specific polarizing component only.

The color filter 24 selects a color of light passing through itself. That is, the color filter 24 has a configuration in which a filter of one color among a red (R) filter, a green (G) filter and a blue (B) filter is formed corresponding to one pixel area described above, and a filter of any one color is formed for each of a plurality of formed pixels. Each of the R, G and B filters is configured so as to mainly transmit a red component, a green component or a blue component of incident light respectively.

Furthermore, the color filter 24 in the reflection area "a" is made of the same color material and has almost the same thickness as that in the transmission area "b". That is, in one pixel area, the reflection area "a" and the transmission area "b" have filters having the same configuration.

In the present invention, "filters having the same configuration" means that filters formed in the reflection area "a" and the transmission area "b" are made of the same color material, that is, the filters are colored with the same dye, pigment or the like, and have almost the same thickness. "Almost the same thickness" means that a difference in the thicknesses between filters is in a range of so-called dispersion caused in a general manufacturing process, and that the film thicknesses are not differed positively. Furthermore, a light shielding film 25 may be provided between the respective filters of the color filter 24, if needed. In such a case, due to the light shielding film 25, it is difficult to form the color filter 24 having a uniform thickness. However, it can be disregarded practically.

On the other hand, the pixel substrate 12 is configured so that a retardation film 32 and a polarizer 33 are provided outside the glass substrate 31, and a resin film 36, a reflection electrode 34 and a transparent electrode 35 are provided inside the glass substrate 31. The retardation film 32 is for adjusting a polarized state of light passing through itself, similar to the retardation film 22. As the retardation film 32, one improving a contrast ratio of reflection display by being used with the polarizer 33 is preferable. For example, a λ/4 retardation film, a λ/4 retardation film and a λ/2 retardation film are laminated such that the λ/2 retardation film is on the polarizer 33 side. As same as the polarizer 23, the polarizer 33 transmits light of a specific polarizing component only.

The reflection electrode 34 serving as a reflective layer is an electrode having a light reflecting function, which is composed of a metal such as Al, Ag and an alloy thereof. The transparent electrode 35 is an electrode made of a transparent conductive material such as ITO and IZO.

The resin film 36 is disposed as a lower layer of the reflection electrode 34 in the reflection area "a". The resin film 36 changes a thickness of the liquid crystal layer 13 corresponding to the reflection area "a" to differ from a thickness of the liquid crystal layer 13 corresponding to the transparent area "b" (hereinafter referred to as "cell gap").

On the opposite side to the liquid crystal layer 13 of the pixel substrate 12, a back light 14 is provided. The back light 14 is a light source used in transmission display.

The retardation film 22 and the polarizer 23 may be disposed on the liquid crystal layer 13 side of the glass substrate 21. Similarly, the retardation film 32 and the polarizer 33 may be disposed on the liquid crystal layer 13 side of the glass substrate 31. And the retardation films 22 and 32 and the polarizers 23 and 33 may be formed not only by attachment but also by application.

The reflection electrode 34 may be a simple reflective layer not having a function as an electrode, and an electrode may be formed separately. In such a case, the reflective layer may be provided on the opposite side of the liquid crystal layer 13 with respect to the glass substrate 31. The reflective layer or the reflection electrode 34 may have an irregular surface so as to have a light scattering property, or may be formed as a mirror surface. In the case of mirror surface, it is preferable that a light scattering layer is provided additionally. The light scattering layer may be used with a light scattering property derived from the reflective layer or the reflection electrode 34.

The cell gaps of the reflection area "a" and the transmission area "b" may be equalized without forming the resin film 36. The liquid crystal layer 13 may be made of a liquid crystal material with positive dielectric anisotropy, or a liquid crystal material with negative dielectric anisotropy, and an alignment method thereof is not limited particularly, and may be a multi domain, domain division or the like.

The light shielding film 25 is not limited to one made of a resin material and may be one made of an inorganic material or made by combining them.

Although a CCFT (cold cathode fluorescent tube) is used as the backlight 14 in the present embodiment, a HCFT (hot cathode fluorescent tube), a white color LED (light emitting diode) or LEDs of a plurality of colors may be used.

Next, a color reproduction range of a color filter will be explained. A color reproduction range of a color filter is, as described above, an inside of a polygon obtained when the chromaticity coordinates (x, y) of light passing through the filters of each of the colors constituting the color filter, that is, light of primary colors emitted from the color filter, is shown on a chromaticity diagram of the CIE 1931 standard colorimetric system, and is defined as the area of the polygon calculated by using the scales of the chromaticity diagram of the CIE 1931 standard calorimetric system.

In the present invention, a color reproduction range of a color filter is defined as an area of a polygon obtained when the chromaticity coordinates (x, y) of light passing through a filter of each color under the conditions of the $D_{65}$ light source and the visual filed of 2° are shown on a chromaticity diagram of the CIE 1931 standard calorimetric system. Furthermore, the chromaticity coordinates (x, y) of light passing through the filter of each color under the conditions of the $D_{65}$ light source and the visual filed of 2° are calculated from the chromaticity coordinates (x, y) of light passing through the filter of each color in a direction normal to the filter face in a state of the filter alone or in a state where the filter is formed on the glass substrate.

Figure 2:
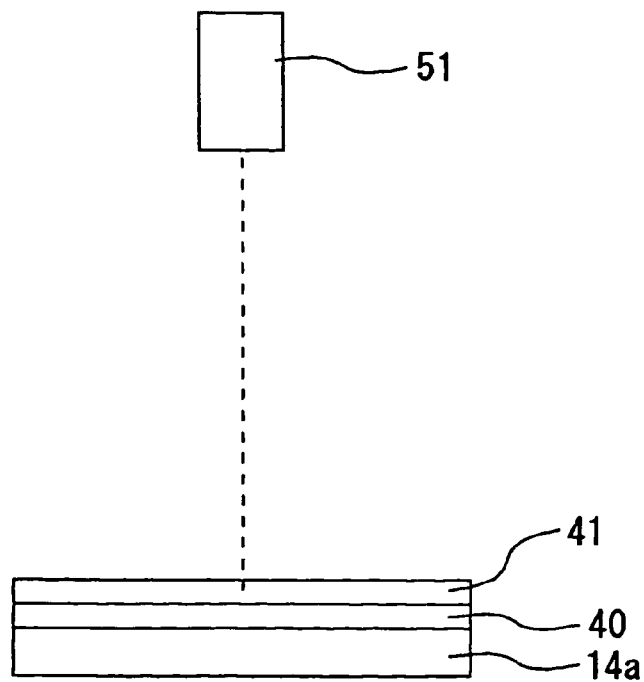
FIG. 2 is an illustration showing a method for measuring a chromaticity of light passing through a filter in a direction normal to the filter face, in which the dotted line shows the direction normal to the filter face.

The chromaticity coordinates (x, y) of light passing through the filter in a direction normal to the filter face are measured by using a light receiving unit 51 in a state where the filter 41 formed on the glass substrate 40 is arranged on the backlight 14a and the backlight 14a is lighted, as shown in FIG. 2. At this time, the light source is not limited to the backlight 14a. The light source may be one irradiating light of all visible light area (380 nm to 780 nm), and a halogen lamp or a xenon lamp may be used, for example. Furthermore, the filters of each color are formed as a plurality of fine patterns. Therefore, by using a microspectroscope or the like as the light receiving unit 51, measurement is performed so that a measurement range per measurement is set within one pattern. In the present embodiment, the measurement range is set to 30 μmφ.

At that time, a thin film such as a base film or a protective film may be formed between the glass substrate 40 and the filter 41, or a protective film may be formed on the filter 41. The glass substrate 40, a base film and a protective film are almost colorless and transparent, and an influence on the chromaticity coordinates (x, y) is just a level that a numerical value of the third decimal place is changed by 1 at most, and can be disregarded.

A color reproduction range of a liquid crystal display device is, as described above, an inside of a polygon obtained when chromaticity coordinates (x, y) of light of each primary color emitted from the liquid crystal display device are shown on a chromaticity diagram of the CIE 1931 standard colorimetric system, and is defined as an area of the polygon calculated by using the scales of the chromaticity diagram of the CIE 1931 standard calorimetric system.

In the present invention, the color reproduction range of the liquid crystal display device is defined as an area of a polygon obtained when chromaticity coordinates (x, y) of light of each primary color emitted from the liquid crystal display device under conditions of a backlight light source and a light receiving angle of 2° are shown on a chromaticity diagram of the CIE 1931 standard calorimetric system. The chromaticity coordinates (x, y) of light of each primary color emitted from the liquid crystal display device under conditions of a backlight light source and a light receiving angle of 2° are calculated from chromaticity coordinates (x, y) of light of each primary color emitted from the liquid crystal display device in a direction normal to the display face thereof.

Figure 3:
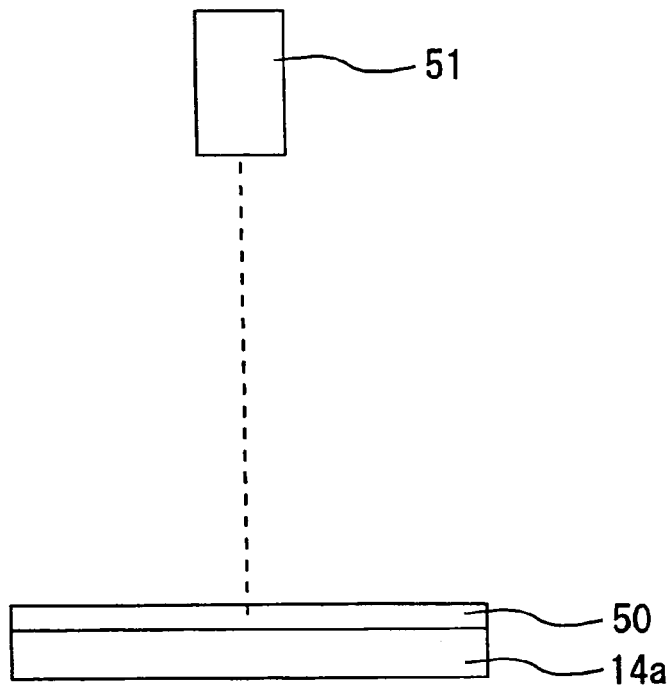
FIG. 3 is an illustration showing a method for measuring a chromaticity of light of each primary color emitted from a liquid crystal display device in a direction normal to the display face in transmission display, in which the dotted line shows the direction normal to the display face of the liquid crystal display device.

The chromaticity coordinates (x, y) of light of each primary color emitted from the liquid crystal display device in a direction normal to the display face thereof in transmission display are measured in a dark room by using the light receiving unit 51 in a state where the liquid crystal display device 50 is disposed on the backlight 14a and the backlight 14a is lighted, as shown in FIG. 3.

In the present embodiment, the SR-3 SPECTRORADIOMETER (product name) manufactured by Topcon Corporation is used as the light receiving unit 51.

Figure 4:
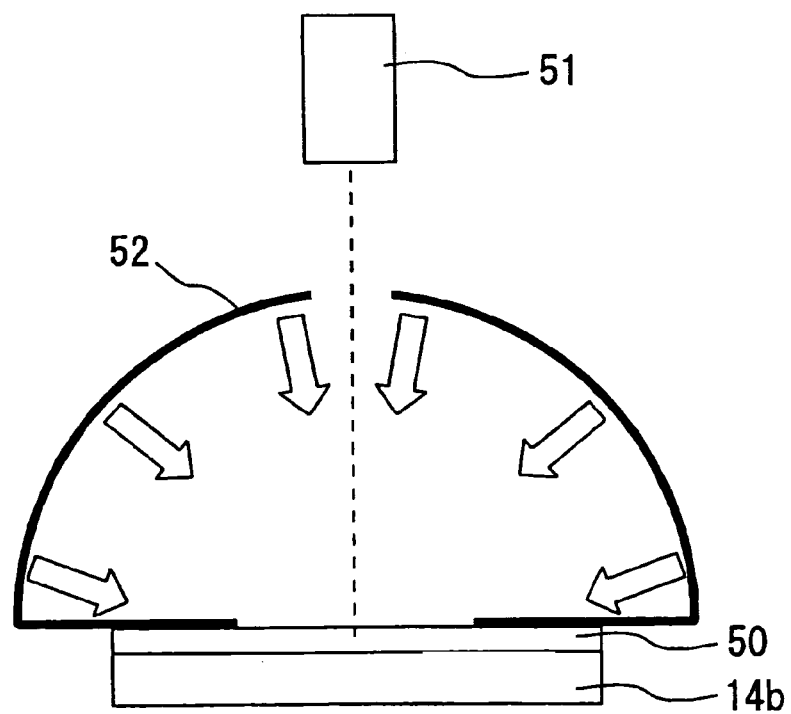
FIG. 4 is an illustration showing a method for measuring a chromaticity of light of each primary color emitted from a liquid crystal display device in a direction normal to the display face in reflection display, in which the dotted line shows the direction normal to the display face of the liquid crystal display device, and the outline arrows with a blank inside indicate light emitted from a diffusion irradiation unit 52.

Furthermore, the chromaticity coordinates (x, y) of light of each primary color emitted from the liquid crystal display device in a direction normal to the display face thereof in reflection display are measured by using the light receiving unit 51 in a state where the liquid crystal display device 50 is disposed on the backlight 14b and the backlight 14b is not lighted and the diffusion irradiation unit 52 is lighted, as shown in FIG. 4.

In the present embodiment, as a device comprising the light receiving unit 51 and the diffusion irradiation unit 52, LCD5200 (product name) manufactured by Otsuka Electronics Co., Ltd. is used.

Consideration will be given for color reproduction ranges when light passing through the color filter once and color reproduction ranges when light passing through the color filter twice. A liquid crystal display device performing both of transmission display and reflection display is configured so as to include a reflection area and a transmission area in one pixel area, for example. In such a configuration, light viewed by an observer is a mixture light of transmission display light, in which the backlight is a light source, and reflection display light, in which surrounding light is a light source. The reflection display light is light passing through the color filter twice, and the transmission display light is light passing through the color filter once.

Therefore, a color reproduction range of a color filter corresponding to reflection display (hereinafter referred to as a "reflection filter color range") is obtained by transmitting light through a color filter twice. On the other hand, a color reproduction range of a color filter corresponding to transmission display (herein after referred to as a "transmission filter color range") is obtained by transmitting light through a color filter once, and therefore the color reproduction range is same as that of the color filter described above.

Accordingly, in order to equalize the color reproduction ranges of the liquid crystal display device between in reflection display and in transmission display, it is considered to equalize the reflection filter color range and the transmission filter color range. However, the reflection filter color range is obtained by transmitting the light through the color filter twice, so the reflection filter color range is larger than the color reproduction range of the color filter. Therefore, in order to equalize the reflection filter color range and the transmission filter color range, it is considered to use different color materials and film thicknesses of the color filter between in the reflection area and in the transmission area.

However, the color reproduction range of the liquid crystal display device depends on not only the color reproduction range of the color filter but also the contrast ratio being a performance of a liquid crystal panel as an optical shutter. When the contrast ratio is 100 or more, the color reproducing range of the liquid crystal display device becomes almost equal to the color reproduction range of the color filter. On the other hand, when the contrast ratio is less than 100, the color reproduction range of the liquid crystal display device becomes smaller than the color reproduction range of the color filter.

The reason why the color reproduction range of the liquid crystal display device becomes smaller than the color reproduction range of the color filter is as follows.

First, the reason why the contrast ratio becomes small is that a light leakage occurs at the time of black display. This is the same as the fact that light leaks from other filters although trying to transmit light through only an R filter, for example. In such a case, the color saturation of red color is lowered in the color reproduction range of the liquid crystal display device, so the color reproduction range of the liquid crystal display device becomes smaller than the color reproduction range of the color filter. This also applies to the filters of other colors, of course.

Also, the reason why the contrast ratio becomes small is that the surrounding light causes unnecessary reflection on a surface of or inside the liquid crystal panel. Thereby, a mixture color with unnecessary reflected light is observed although transmitting light only through the R filter, for example. Even in this case, the color saturation of red color becomes lower in the color reproduction range of the liquid crystal display device, whereby the color reproduction range of the liquid crystal display device becomes smaller than the color reproduction range of the color filter. This also applies to the filters of other colors, of course.

Accordingly, when the contrast ratios are different between in the reflection display and in the transmission display, the color reproduction ranges of the liquid crystal display device differ between in the reflection display and in the transmission display, even though the reflection filter color range and the transmission filter color range are equal.

The contrast ratio in the transmission display is generally 100 to 200, and the contrast ratio in the reflection display is, in the case of a liquid crystal display device using a polarizer, generally about 20 to 50. Therefore, the color reproduction range of the liquid crystal display device in the transmission display is almost equal to the transmission filter color range, but the color reproduction range of the liquid crystal display device in the reflection display becomes smaller than the reflection filter color range.

In this way, although the color filters in the reflection area and the transmission area are designed separately so as to equalize the reflection filter color range and the transmission filter color range, that is, although the color filters are designed on ground that the number of times light passes through the color filters are different between in the reflection area and in the transmission area, the color reproduction ranges of the liquid crystal display device differ between in the reflection display and in the transmission display due to the difference in the contrast ratios.

The contrast ratio will be explained in detail. The contrast ratio changes depending on the surrounding light. In particular, relating to the transmission display, the contrast ratio dramatically reduces to 10 or less in the outdoor environment in most cases, even though the contrast ratio in the indoor environment is 1000.

This is due to an unnecessary reflection in the liquid crystal display device. The unnecessary reflection means a reflection on a surface of the liquid crystal display device and an inside reflection of the liquid crystal display device. The reflection on a surface is an interface reflection generated at an interface between a surface and air. Also, the inside reflection is an interface reflection between respective layers constituting the liquid crystal display device and having different refractive indexes.

Furthermore, when a light shutter function of the liquid crystal panel is not sufficient, a light leakage occurs at the time of black display, which also causes reduction of the contrast ratio. Since the current light shutter function of the transmission display is high enough to disregard the light leakage at the time of black display. On the other hand, in the reflection display, the light leakage cannot be disregarded.

This is because the surrounding light serving as a light source of the reflection display is diffusive light made incident from every direction except for a particular case. That is, the surrounding light made incident from every direction passes through the liquid crystal layer via various paths and in various polarized states, and is not able to be shielded to reach an observer. Therefore, the contrast ratio in the reflection display becomes lower than that in the transmission display, and the contrast ratio in the reflection display may be about 10 to 50, or about 20 to 50 in the case of using a polarizer.

In view of the above, in the liquid crystal display device according to the present embodiment, the color reproduction range of the color filter 24 is designed such that the color reproduction ranges of the liquid crystal display device in the reflection display and the transmission display become almost equal. Specifically, a color filter having a color reproduction range of 0.079 or more with the reflection area "a" and the transmission area "b" formed in the same configuration is used as the color filter 24.

The color reproduction range of 0.079 or more corresponds to NTSC ratio of 50% or more.

The NTSC ratio means a ratio of an area of a polygon showing a color reproduction range on a chromaticity diagram of the CIE 1931 standard calorimetric system, and the area of a polygon serving as a standard is defined as an area of a triangle having R (x=0.670, y=0.330), G (x=0.210, y=0.710), and B (x=0.140, y=0.080) as vertexes. An area ratio of a polygon to the polygon serving as the standard is the NTSC ratio.

Figure 6:
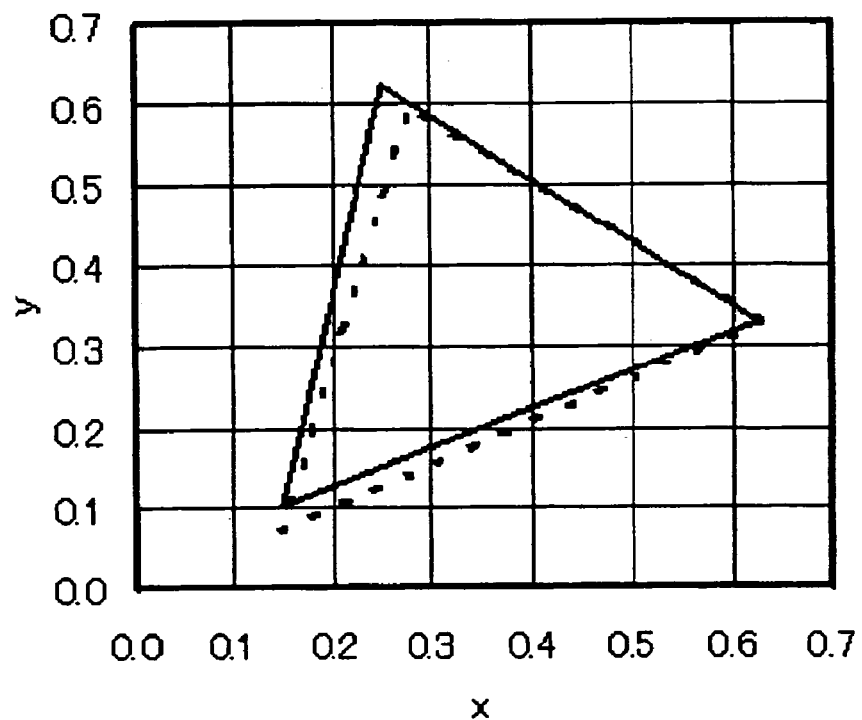
FIG. 6 is an illustration showing a color reproduction range where a contrast ratio in reflection display is 30 on a chromaticity diagram of the CIE 1931 standard calorimetric system (Embodiment 1)

The color filter of the present embodiment includes filters of three colors, that is, R, G and B. Therefore, the color reproduction range of the color filter and the color reproduction range of the liquid crystal display device according to the present embodiment are shown as an area of a triangle having chromaticity coordinates (x, y) of R, G and B as vertexes on a chromaticity diagram of the CIE 1931 standard calorimetric system, as shown in FIG. 6, etc.

In the present invention, filters of three colors being yellow, cyan and magenta, for example, may be used as a color filter. And the color filter may include filters of four or more colors. In this case, the color reproduction range of the color filter and the color reproduction range of the liquid crystal display device are shown as an area of a polygon corresponding to the number of colors of the filters.

The preferable color reproduction range of the color filters shown in the present embodiment and a preferable range of the color reproduction range ratio of the liquid crystal display device are effective similar to the case of using filters of three colors, that is, R, G and B, regardless of filters of any colors or any number of colors being used.

Embodiment 1

In the liquid crystal display device shown in FIG. 1, a color filter having a color reproduction range of 0.114 (NTSC ratio is 72%) is used as the color filter 24. The color reproduction range of the color filter 24 is measured under the conditions of the $D_{65}$ light source and the visual field of 2° as described above. At this time, the reflection filter color range becomes 0.145 (NTSC ratio is 91%) since light passes through the color filter 24 twice.

The fact that light passes through the same filter twice is equal to an optical density being doubled, which is same as a density of the color material being doubled or a thickness of the filter being doubled. Therefore, the reflection filter color range can be obtained without an actual measurement by obtaining a spectral transmittance when light passes through the filter twice from a spectral transmittance of a filter of each color (transmittance at each wavelength) by using the Lambert-Beer law, and using a method for calculating tristimulus values (XYZ in the CIE 1931 standard calorimetric system) well-known to those skilled in the art and a method for calculating chromaticity coordinates (chromaticity diagram of XYZ in the CIE 1931 standard calorimetric system).

Figure 5:
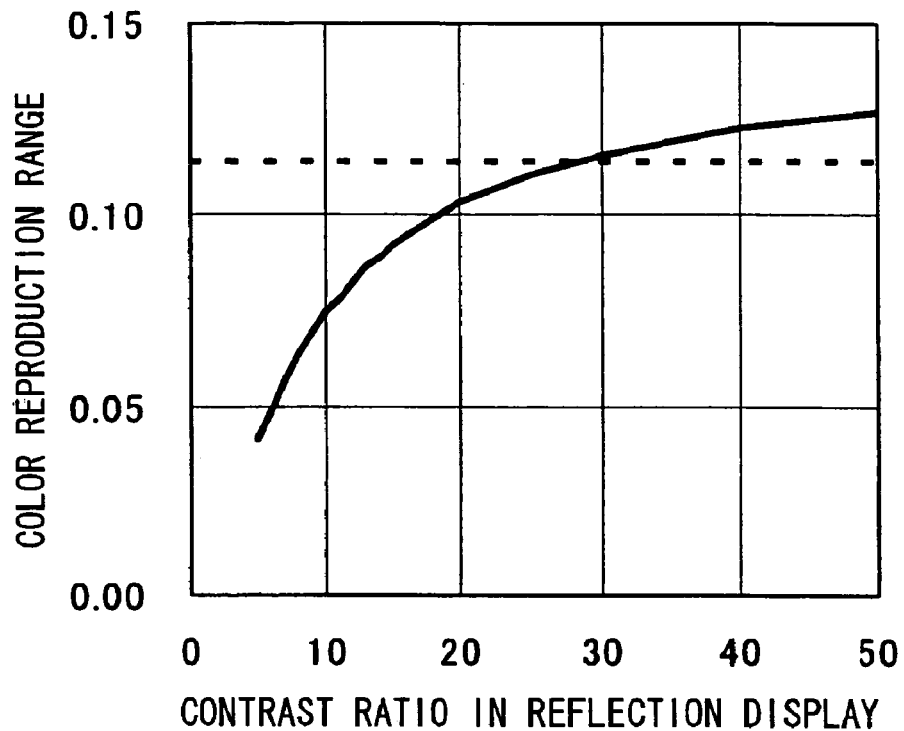
FIG. 5 is a graph showing a relationship between a contrast ratio in reflection display and a color reproduction range (Embodiment 1)

FIG. 5 is a graph showing a relationship between a contrast ratio in reflection display and a color reproduction range of the liquid crystal display device in reflection display. As shown in FIG. 5, the color reproduction range of the liquid crystal display device in the reflection display becomes smaller than the reflection filter color range of 0.145 (NTSC ratio is 91%) along with a decrease in the contrast ratio.

The color reproduction range of the liquid crystal display device when the contrast ratio is changed can be calculated by the following method.

First, tristimulus values (XYZ in the CIE 1931 standard calorimetric system) of the color filter are obtained. In the case of an R filter for example, the tristimulus values ($X_{RCF}$, $Y_{RCF}$, $Z_{RCF}$) can be obtained by using the method for calculating the tristimulus values from the spectral transmittance. Similarly, for G and B filters, the tristimulus values ($X_{GCF}$, $Y_{GCF}$, $Z_{GCF}$) and ($X_{BCF}$, $Y_{BCF}$, $Z_{BCF}$) can be obtained from spectral transmittances. From the tristimulus values of RGB, the chromaticity coordinates (x, y) can be obtained for R, G and B, respectively, by using the method for calculating the chromaticity coordinates described above.

Next, tristimulus values (XYZ in the CIE 1931 standard calorimetric system) of the liquid crystal display device are obtained. The tristimulus values of the liquid crystal display device ($X_{LC}$, $Y_{LC}$, $Z_{LC}$) are calculated by, in the case of an R pixel for example, considering light leakages of G and B pixels. A transmittance (reflectance in the case of reflection display) in a state where the liquid crystal display device having no color filter shows the highest transmittance (gradation showing the highest transmittance among graduation displays) is defined as $T_W$, and a transmittance (reflectance in the case of reflection display) in a state where the liquid crystal display device having no color filter shows the lowest transmittance (gradation showing the lowest transmittance among gradation displays) is defined as $T_{BK}$. The contrast ratio at this time can be shown as $T_W/T_{BK}$. Then, the tristimulus values ($X_{RLC}$, $Y_{RLC}$, $Z_{RLC}$) in the display of R of the liquid crystal display device can be obtained by the following equations:

$$X_{RLC}=(T_W \times X_{RCF})+(T_{BK} \times X_{GCF})+(T_{BX} \times X_{BCF})$$

$$Y_{RLC}=(T_W \times Y_{RCF})+(T_{BK} \times Y_{GCF})+(T_{BK} \times Y_{BCF})$$

$$Z_{RLC}=(T_W \times Z_{RCF})+(T_{BK} \times Z_{GCF})+(T_{BK} \times Z_{BCF})$$

Similarly, in the case of a G pixel, it can be obtained while considering light leakages of R and B pixels, and in the case of B pixel, it can be obtained while considering light leakages of R and G pixels.

Furthermore, from these tristimulus values, chromaticity coordinates (x, y) of R, G and B respectively can be obtained by using the method for calculating chromaticity coordinates.

The broken line in FIG. 5 shows 0.114 (NTSC ratio is 72%) which is a color reproduction range of the liquid crystal display device where the transmission display has a contrast ratio of 100 or more. Although the color reproduction range of the liquid crystal display device in the transmission display is equal to the color reproduction range (0.114) of the color filter, this is not because an influence of a difference in spectral characteristics between the $D_{65}$ light source and the backlight 14 is not considered, but because only fourth decimal places or smaller are affected even if it is considered, and it is not included in an effective numeric characters described in the present specification.

As shown in FIG. 5, when the contrast ratio is 30, the color reproduction range of the liquid crystal display device in the reflection display is 0.116 (NTSC ratio is 73%), and the color reproduction range of the liquid crystal display device in the transmission display is 0.114 (NTSC ratio is 72%) as described above. Therefore, the color reproduction range ratio of the liquid crystal display device is 1.02, and a difference between them is small.

FIG. 6 is an illustration showing the color reproduction range of the liquid crystal display device of this time on a chromaticity diagram of the CIE 1931 standard colorimetric system. In FIG. 6, a continuous line shows the color reproduction range of the liquid crystal display device in the reflection display where the contrast ratio is 30, and a broken line shows the color reproduction range of the liquid crystal display device in the transmission display where the contrast ratio is 100 or more. As shown in FIG. 6, both color reproduction ranges are almost the same, and are triangles having substantially the same area.

As shown in FIG. 5, the color reproduction range of the liquid crystal display device in the reflection display, when the contrast ratio is 20, is 0.105 (NTSC ratio is 66%), and the color reproduction range of the liquid crystal display device in the reflection display, when the contrast ratio is 50, is 0.127 (NTSC ratio is 80%). Then, since the color reproduction range of the liquid crystal display device in the transmission display is 0.114 (NTSC ratio is 72%) as described above, the color reproduction range ratio of the liquid crystal display device, when the contrast ratio is 20 to 50, is 0.92 to 1.11.

When the color reproduction range ratio of the liquid crystal display device is 0.70 to 1.30 (1±0.30), a difference between them is small enough not to cause a problem in practice.

Comparative Example 1

In the liquid crystal display device shown in FIG. 1, a color filter having a color reproduction range of 0.047 (NTSC ratio is 30%) is used as the color filter 24. The color reproduction range of the color filter 24 is measured under the conditions of the $D_{65}$ light source and the visual field of 2° as described above. The reflection filter color range at this time is 0.090 (NTSC ratio is 57%) since light passes through the color filter 24 twice.

This color filter corresponds to the first method described as the previous art in the present specification. In the first method, it is typical that a color filter having a NTSC ratio of 30 to 40% is used, and the NTSC ratio is about 45% at most.

Figure 7:
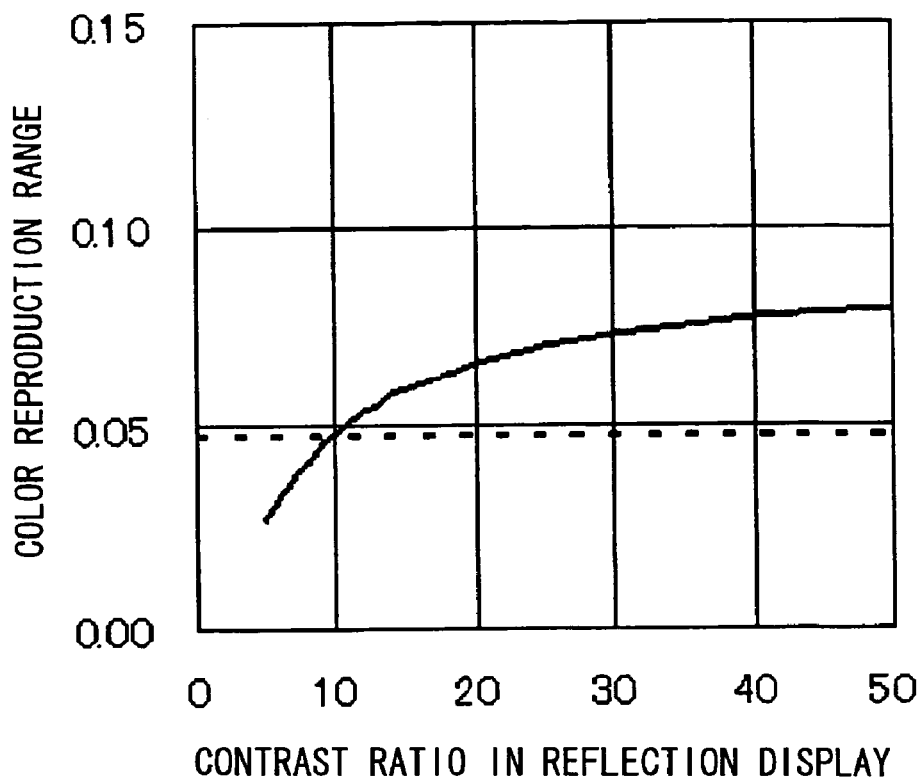
FIG. 7 is a graph showing a relationship between a contrast ratio in reflection display and a color reproduction range (Comparative Example 1)

FIG. 7 is a graph showing a relationship between a contrast ratio in the reflection display and a color reproduction range of the liquid crystal display device in the reflection display. As shown in FIG. 7, the color reproduction range of the liquid crystal display device in the reflection display becomes smaller than the reflection filter color range of 0.090 (NTSC ratio is 57%) along with a decrease in the contrast ratio.

A broken line in FIG. 7 shows 0.048 (NTSC ratio is 30%) which is a color reproduction range of the liquid crystal display device where the transmission display has a contrast ratio of 100 or more. The color reproduction range of the liquid crystal display device in the transmission display is slightly larger than the color reproduction range of the color filter (0.047 (NTSC ratio is 30%)). This is caused by a difference in spectral characteristics between the $D_{65}$ light source and the backlight 14.

In FIG. 7, when the contrast ratio is 20 to 50, the color reproduction range of the liquid crystal display device in the reflection display is 0.066 (NTSC ratio is 42%) to 0.080 (NTSC ratio is 50%).

Therefore, the color reproduction range ratio of the liquid crystal display device is 1.38 to 1.67, and a large difference is caused between them.

Figure 8:
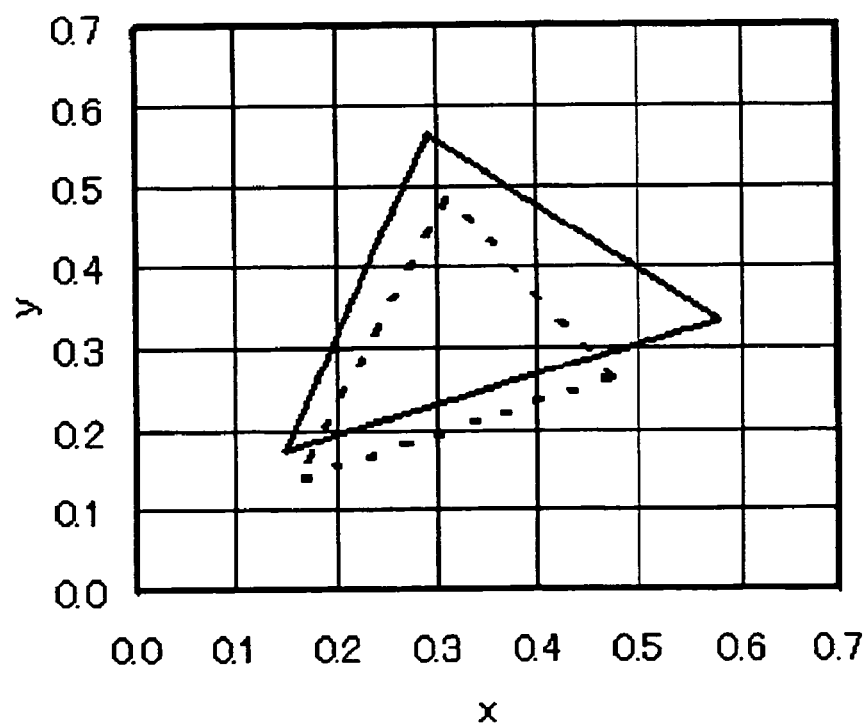
FIG. 8 is an illustration showing a color reproduction range where a contrast ratio in reflection display is 30 on a chromaticity diagram of the CIE 1931 standard colorimetric system (Comparative Example 1)

FIG. 8 is an illustration showing the color reproduction range of the liquid crystal display device on a chromaticity diagram of the CIE 1931 standard calorimetric system.

In FIG. 8, a continuous line shows the color reproduction range of the liquid crystal display device in the reflection display where the contrast ratio is 30, and a broken line shows the color reproduction range of the liquid crystal display device in the transmission display where the contrast ratio is 100 or more.

As shown in FIG. 8, the color reproduction range of the liquid crystal display device in the reflection display clearly has a larger triangle than the color reproduction range of the liquid crystal display device in the transmission display. The color reproduction range in the reflection display at this time is 0.073 (NTSC ratio is 46%), and the color reproduction range ratio of the liquid crystal display device is 1.52.

Embodiment 2

In the liquid crystal display device shown in FIG. 1, a color filter having a color reproduction range of 0.079 (NTSC ratio is 50%) is used as the color filter 24. The color reproduction range of the color filter 24 is measured under the conditions of the $D_{65}$ light source and the visual field of 2° as described above. The reflection filter color range at this time is 0.119 (NTSC ratio is 75%) since light passes through the color filter 24 twice.

Figure 9:
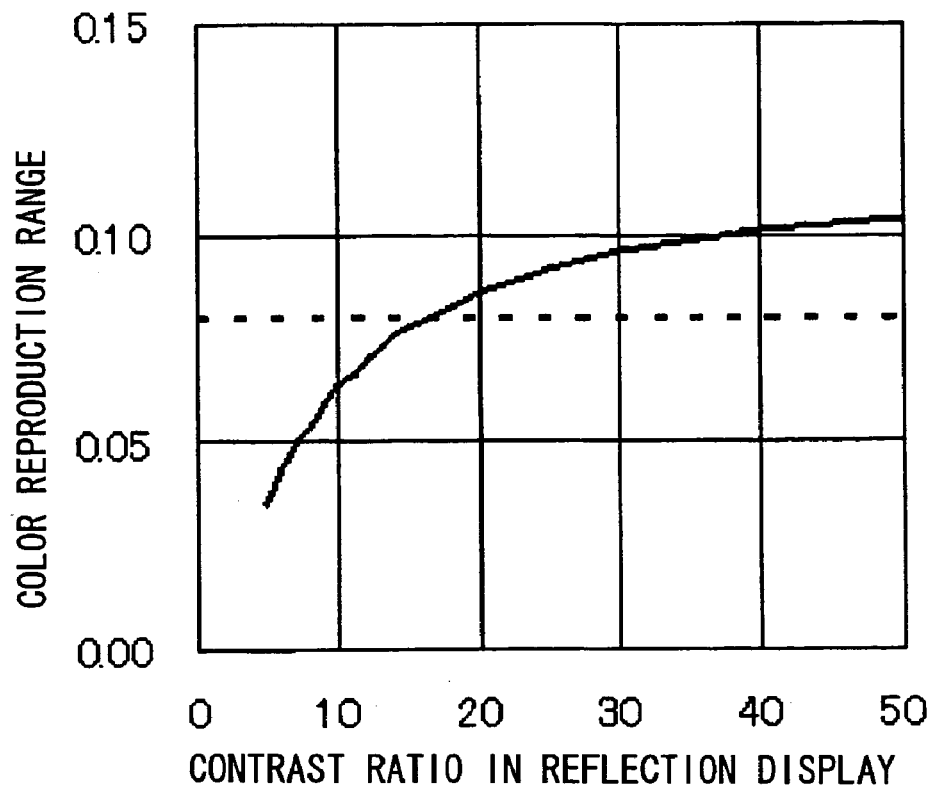
FIG. 9 is a graph showing a relationship between a contrast ratio in reflection display and a color reproduction range (Embodiment 2)

FIG. 9 is a graph showing a relationship between the contrast ratio in the reflection display and the color reproduction range of the liquid crystal display device in the reflection display. As shown in FIG. 9, the color reproduction range of the liquid crystal display device in the reflection display becomes smaller than the reflection filter color range of 0.119 (NTSC ratio of 75%) along with a decrease in the contrast ratio.

A broken line in FIG. 9 shows 0.080 (NTSC ratio is 50%) which is a color reproduction range of the liquid crystal display device where the transmission display has a contrast ratio of 100 or more. The color reproduction range of the liquid crystal display device in the transmission display is slightly larger than the color reproduction range of the color filter (0.079 (NTSC ratio is 50%)). This is caused by a difference in spectral characteristics between the $D_{65}$ light source and the backlight 14.

As shown in FIG. 9, when the contrast ratio is 20 to 50, the color reproduction range of the liquid crystal display device in the reflection display is 0.086 (NTSC ratio is 55%) to 0.104 (NTSC ratio is 66%). Therefore, the color reproduction range ratio of the liquid crystal display device is 1.08 to 1.30, and a difference between them is small enough not to cause a problem in practice.

Figure 10:
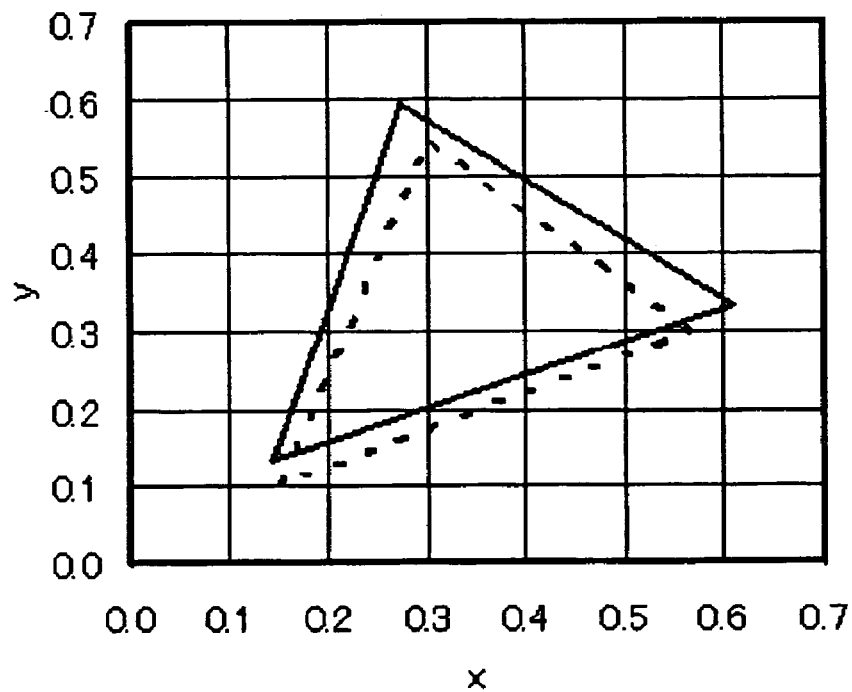
FIG. 10 is an illustration showing a color reproduction range where a contrast ratio in reflection display is 30 on a chromaticity diagram of the CIE 1931 standard colorimetric system (Embodiment 2)

FIG. 10 is an illustration showing the color reproduction range of the liquid crystal display device on a chromaticity diagram of the CIE 1931 standard calorimetric system. In FIG. 10, a continuous line shows the color reproduction range of the liquid crystal display device in the reflection display where the contrast ratio is 30, and a broken line shows the color reproduction range of the liquid crystal display device in the transmission display where the contrast ratio is 100 or more.

As shown in FIG. 10, both color reproduction ranges are almost the same, and are triangles having substantially the same area. At this time, the color reproduction range in the reflection display is 0.096 (NTSC ratio is 61%), and the color reproduction range ratio of the liquid crystal display device is 1.20.

In this way, when the contrast ratio in the reflection display is 20 to 50, the color reproduction range ratio of the liquid crystal display can be small by setting the color reproduction range of the color filter to be 0.079 (NTSC ratio is 50%) or more.

Embodiment 3

In the liquid crystal display device shown in FIG. 1, a filter having a color reproduction range of 0.095 (NTSC ratio is 60%) is used as the color filter 24. The color reproduction range of the color filter 24 is measured under the conditions of the $D_{65}$ light source and the visual field of 2° as described above. At this time, the reflection filter color range is 0.130 (NTSC ratio is 82%) since light passes through the color filter 24 twice.

Figure 11:
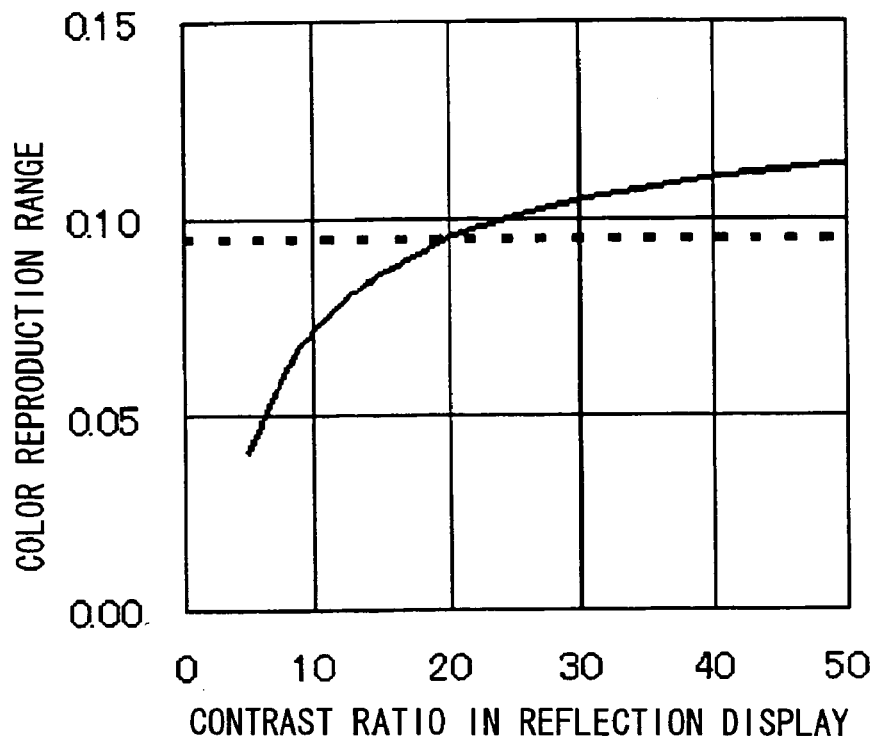
FIG. 11 is a graph showing a relationship between a contrast ratio in reflection display and a color reproduction range (Embodiment 3)

FIG. 11 is a graph showing a relationship between the contrast ratio in the reflection display and the color reproduction range of the liquid crystal display in the reflection display. As shown in FIG. 11, the color reproduction range of the liquid crystal display device in the reflection display becomes smaller than the reflection filter color range of 0.130 (NTSC ratio is 82%) along with a decrease in the contrast ratio.

A broken line in FIG. 11 shows 0.095 (NTSC ratio is 60%) which is a color reproduction range of the liquid crystal display device where the transmission display has a contrast ratio of 100 or more. Although the color reproduction range of the liquid crystal display device in the transmission display is equal to the color reproduction range (0.095) of the color filter, this is not because an influence of a difference in spectral characteristics between the $D_{65}$ light source and the backlight 14 is not considered, but because only fourth decimal places or smaller are affected even if it is considered, and it is not included in an effective numeric characters described in the present specification.

As shown in FIG. 11, when the contrast ratio is 20 to 50, the color reproduction range of the liquid crystal display device in the reflection display is 0.095 (NTSC ratio is 60%) to 0.114 (NTSC ratio is 72%). Therefore, the color reproduction range ratio of the liquid crystal display device is 1.00 to 1.20, and a difference between them is small enough not to cause a problem in practice.

Figure 12:
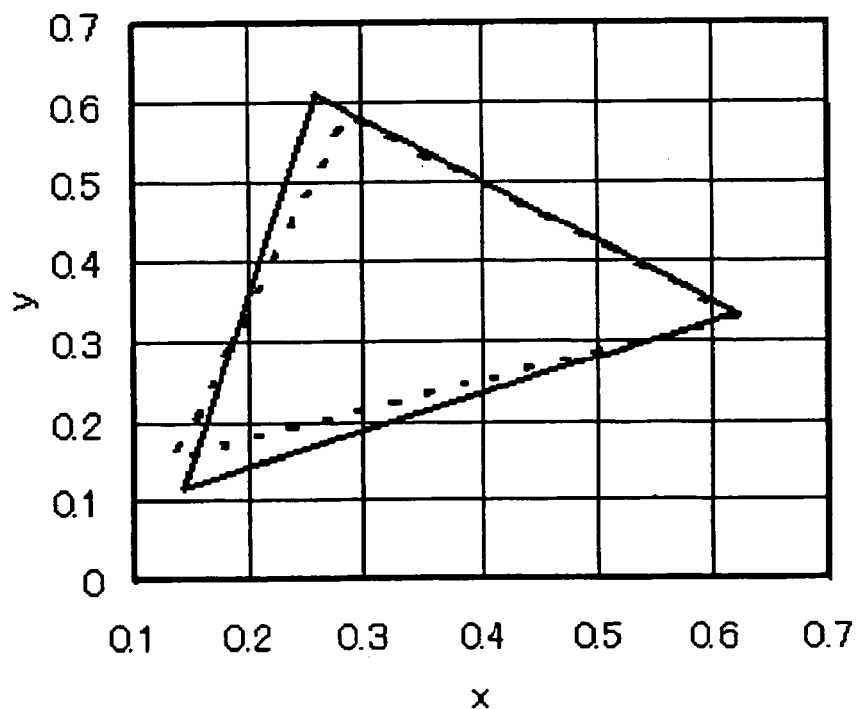
FIG. 12 is an illustration showing a color reproduction range where a contrast ratio in reflection display is 30 on a chromaticity diagram of the CIE 1931 standard colorimetric system (Embodiment 3)

FIG. 12 is an illustration showing the color reproduction range of the liquid crystal display device on a chromaticity diagram of the CIE 1931 standard calorimetric system. In FIG. 12, a continuous line shows the color reproduction range of the liquid crystal display device in the reflection display where the contrast ratio is 30, and a broken line shows the color reproduction range of the liquid crystal display in the transmission display where the contrast ratio is 100 or more.

As shown in FIG. 12, both color reproduction ranges are almost the same, and are triangles having substantially the same area. At this time, the color reproduction range in the reflection display is 0.105 (NTSC ratio is 67%), and the color reproduction range ratio of the liquid crystal display device is 1.11.

Summarizing Embodiments 1 to 3 described above, a further explanation will be given below.

Figure 13:
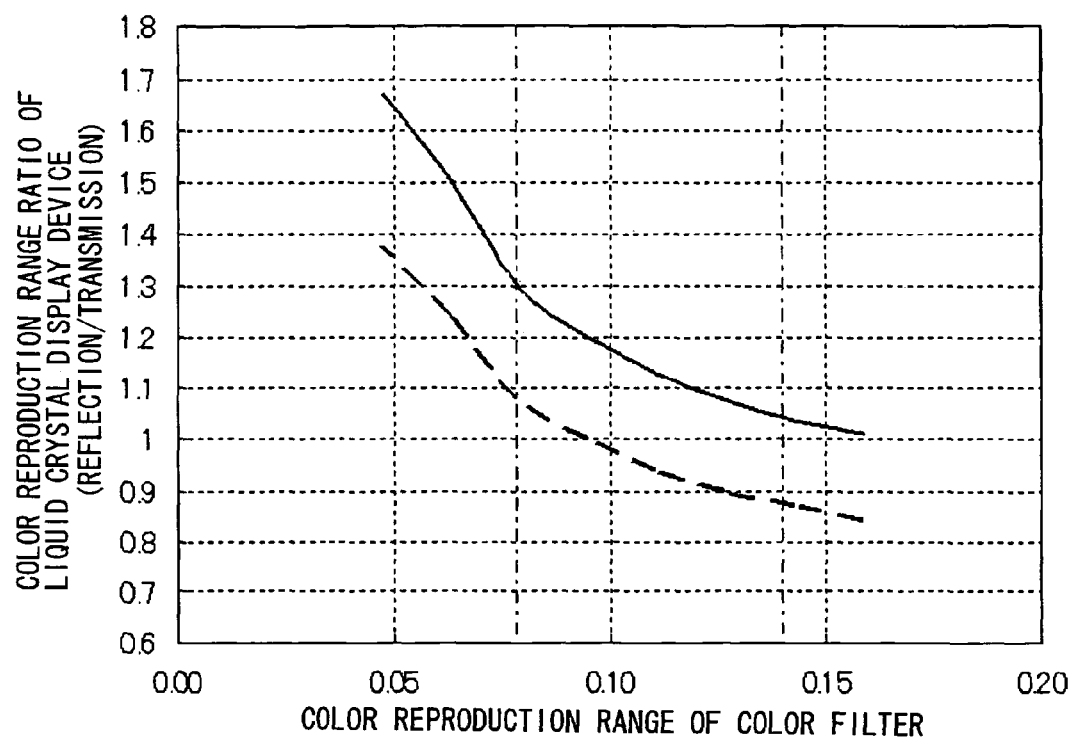
FIG. 13 is a graph showing a relationship between a color reproduction range of a color filter and a color reproduction range ratio of a liquid crystal display device.

FIG. 13 is a graph showing a relationship between the color reproduction range of the color filter and the color reproduction range ratio of the liquid crystal display device. In FIG. 13, a continuous line indicates a color reproduction range ratio of the liquid crystal display device when the contrast ratio in the reflection display is 50 and the contrast ratio in the transmission display is 100 or more. On the other hand, a broken line indicates a color reproduction range ratio of the liquid crystal display device when the contrast ratio in the reflection display is 20 and the contrast ratio in the transmission display is 100 or more.

As shown in FIG. 13, when the contrast ratio in the reflection display is 20 to 50 and the contrast ratio in the transmission display is 100 or more and in the case where the color reproduction range of the color filter is 0.079 (shown by an alternate long and short dashed line in FIG. 13) or more, it is possible to make the color reproduction range ratio of the liquid crystal display device close to 1.00. When the color reproduction range of the color filter becomes smaller than 0.079, the color reproduction range ratio of the liquid crystal display device becomes larger sharply. Therefore, when the color reproduction range of the color filter is set to be 0.079 or more, it is possible to realize display of almost the same color reproduction range in the reflection display and in the transmission display regardless of environment of surrounding light.

When the color reproduction range of the color filters becomes too large, the light transmittance of the color filter becomes small and the brightness of the display is reduced, which is a problem in practice. Therefore, it is preferable to set an upper limit of the color reproduction range of the color filter to be 0.140 (shown by an alternate long and short dashed line in FIG. 13) or less in order that a Y value of the color filter (Y in the CIE 1931 standard calorimetric system) can be 20% or more.

The Y value of the color filter used herein means, when the color filter consists of filters of three colors that are R, G and B for example, an average value of the Y values of the respective colors. Therefore, even when Y values of one or two colors are less than 20%, a problem is not caused practically when the average value of the Y values of the filters of three colors is 20% or more. This also applies to a color filter consisting of filters of four or more colors.

Also, in the present embodiment, the color filter 24 having the same configuration in the reflection area "a" and the transmission area "b" is used. Thereby, it is possible to lower producing costs since forming process of the color filter is simplified comparing with the case where color filters of different configurations are provided in the both areas "a" and "b".

In such a case, the reflection filter color range becomes larger than the color reproduction range of the color filter naturally. Then, as described above, the contrast ratio in the reflection display becomes smaller than that in the transmission display in the indoor environment. By considering a decrease in the contrast ratio in the reflection display and setting the color reproduction range of the color filter to be 0.079 or more, the color reproduction ranges of the liquid crystal display device in the reflection display and the transmission display can be made closer.

Furthermore, by using the color filters 24 of the same configuration in the reflection area "a" and the transmission area "b", the present invention can be applied to a liquid crystal display device of a semi-transmissive type using a semi-transmissive film in which one pixel area is not divided into a reflection area and a transmission area. As a semi-transmissive film, a half mirror or an extremely thin film made of a metal with high reflectance is known. When the semi-transmissive film is made of a conductive material such as a metal, it may be used as an electrode. And, the semi-transmissive film may be laminated on a transparent electrode so that the transparent electrode is on the liquid crystal layer side or the semi-transmissive film is on the liquid crystal layer side. When the transparent electrode is laminated on the liquid crystal layer side, other layers such as an insulating film may be provided between the semi-transmissive film and the transparent electrode. Even in such a semi-transmissive type liquid crystal display device, a color filter of the configuration as in Comparative Example 1 has been used previously since the brightness of the reflection display has been emphasized. In the present embodiment, the reflection area "a" and the transmission area "b" each has the color filter 24 having the same configuration. However, the configurations of the color filter may be different between in the reflection area "a" and in the transmission area "b" provided that the color reproduction range of the color filter in the reflection area "a" and the transmission area "b" is 0.079 or more and the color reproduction range ratio of the liquid crystal display device can be 0.70 to 1.30 as described above.

According to the present invention, by using a color filter having a larger color reproduction range than that of a color filter previously considered as inappropriate due to a dark reflection display, it is possible to make the color reproduction range of liquid crystal display device in reflection display closer to that in transmission display. This is developed, based on a new technical concept that an observer can easily recognize display when a color reproduction range is enlarged although brightness is sacrificed in reflection display, which is different from a previous technical concept that an observer is difficult to recognize display unless brightness is secured in reflection display.

In the present invention, transmission display light and reflection display light having a color similar to the transmission display light are observed in indoor environment where both transmission display light and reflection display light are observed, and an observer observes display light with high color saturation which is almost the same as the case of the transmission display light only. On the other hand, in a previous color filter where brightness of reflection display is secured, display light with lower color saturation is observed comparing with the case of observing transmission display light only, since the transmission display light with high color saturation and the reflection display light with low color saturation are mixed.

Furthermore, in the present invention, reflection display light having a color similar to transmission display light is observed in outdoor environment where the reflection display light is mainly observed, and an observer hardly recognizes a color difference from the transmission display light. Even in the case where a color reproducibility of the color filter is enlarged, darkness of display is hardly recognized, since a light source is sunlight. On the other hand, in a previous color filter where brightness of reflection display is secured, the reflection display light of much lower color saturation than that of the transmission display light is observed.

Further, in the present invention, since a color filter having a larger color reproduction range than that of a color filter in a previous transflective type liquid crystal display device is used, it is possible to obtain transmission display light with a larger color reproduction range than ever before.

What is claimed is:

1. A liquid crystal display device for performing reflection display and transmission display, the device comprising:
a backlight source,
a color filter including filters of n colors which are at least three colors,
the filters of n colors including a filter of one color formed corresponding to each of a plurality of pixels,
the color filter having a color reproduction range of 0.079 or more,
the color reproduction range, when light of n colors after passing through the filters of n colors is shown as chromaticity coordinates (x, y) of n points on a chromaticity diagram of a CIE 1931 standard colorimetric system, under conditions of a $D_{65}$ light source and a visual field of 2°, being defined by an area of a polygon having the n points as vertexes,
the color filter being used for both of the reflection display and the transmission display, the filter of one color corresponding to one pixel and having a same configuration in the entire area of the pixel, wherein the reflection display and the transmission display are performed by only light that has passed through the color filter; and
wherein light used for the reflection display passes through the color filter twice in a reflection area of the display device and light used for the transmission display passes through the color filter once in a transmission area of the display device, and wherein a value calculated by dividing a color reproduction range of the liquid crystal display device in the reflection display by a color reproduction range of the liquid crystal display device in the transmission display is 0.70 to 1.30, wherein
the color reproduction range of the liquid crystal display device in the transmission display, when light of n colors emitted from the liquid crystal display device is shown as chromaticity coordinates (x, y) of n points on a chromaticity diagram of a CIE 1931 standard colorimetric system under conditions of the backlight source and a light receiving angle of 2°, being defined by an area of a polygon having the n points as vertexes, and
the color reproduction range of the liquid crystal display device in the reflection display, when light of n colors emitted from the liquid crystal display device is shown as chromaticity coordinates (x, y) of n points on a chromaticity diagram of a CIE 1931 standard colorimetric system under conditions of a diffusion irradiation light without the backlight source and a light receiving angle of 2°, being defined by an area of a polygon having the n points as vertexes.

2. The liquid crystal display device according to claim 1, wherein the color reproduction range of the color filter is 0.140 or less.

3. The liquid crystal display device according to claim 1, wherein the liquid crystal display device has a contrast ratio of 100 or more when performing the transmission display, and has a contrast ratio of 20 or more and 50 or less when performing the reflection display.

4. A method for producing the liquid crystal display device according to claim 1, comprising a forming a filter of one color among filters of n colors constituting a color filter in a transmission area, and a filter of the same color constituting a color filter in a reflection area as the filter of one color.

5. A liquid crystal display device in which a reflection area for performing reflection display and a transmission area for performing transmission display are formed in one pixel area, the device comprising:
a backlight source,
a color filter including filters of n colors which are at least three colors,
the filters of n colors including a filter of one color formed corresponding to each of a plurality of pixels,
the filter of one color corresponding to one pixel and having a same configuration in the reflection area as in the transmission area,
the filter of one color entirely overlapping with both the transmission area and the reflection area;
the color filter having a color reproduction range of 0.079 or more, and the color reproduction range, when light of n colors after passing through the filters of n colors is shown as chromaticity coordinates (x, y) of n points on a chromaticity diagram of a CIE 1931 standard colorimetric system under conditions of a $D_{65}$ light source and a visual field of 2°, being defined by an area of a polygon having the n points as vertexes; and wherein light used for the reflection display passes through the color filter twice in the reflection area of the display device and light used for transmission display passes through the color filter once in the transmission area of the display device, and wherein a value calculated by dividing a color reproduction range of the liquid crystal display device in the reflection display by a color reproduction range of the liquid crystal display device in the transmission display is 0.70 to 1.30, wherein the color reproduction range of the liquid crystal display device in the transmission display, when light of n colors emitted from the liquid crystal display device is shown as chromaticity coordinates x of n points on a chromaticity diagram of a CIE 1931 standard colorimetric system under conditions of the backlight source and a light receiving angle of 2°, being defined by an area of a polygon having vertexes, and the color reproduction range of the liquid crystal display device in the reflection display, when light of n colors emitted from the liquid crystal display device is shown as chromaticity coordinates (x, y) of n points on a chromaticity diagram of a CIE 1931 standard calorimetric system under conditions of a diffusion irradiation light without the backlight source and a light receiving angle of 2°, being defined by an area of a polygon having the n points as vertexes.

6. The liquid crystal display device according to claim 5, wherein the color reproduction range of the color filter is 0.140 or less.

7. The liquid crystal display device according to claim 5, wherein the liquid crystal display device has a contrast ratio of 100 or more when performing the transmission display, and has a contrast ratio of 20 or more and 50 or less when performing the reflection display.

8. A liquid crystal display device, comprising:
a backlight source;
a transmission electrode, disposed forward of the backlight source, for transmitting light from the backlight source, in a transmission display state of the liquid crystal display device;
a reflection electrode, disposed forward of the backlight source, for reflecting light made incident from a front face in a reflection display state of the liquid crystal display device; and
a color filter, disposed forward of the transmission electrode and the reflection electrode, for transmitting light passing through the transmission electrode, light made incident from the front face, and light reflected by the reflection electrode among the light made incident from the front face,
the color filter entirely overlapping with both an area where the transmission electrode is formed and an area where the reflection electrode is formed;
the color filter corresponding to one pixel and having a same configuration in the area corresponding to the reflection electrode as in the area corresponding to the transmission electrode,
the color filter having a color reproduction range of 0.079 or more, and the color reproduction range, when light of n colors after passing through the filters of n colors is shown as chromaticity coordinates (x, y) of n points on a chromaticity diagram of a CIE 1931 standard colorimetric system under conditions of a $D_{65}$ light source and a visual field of 2°, being defined by an area of a polygon having the n points as vertexes; and wherein light for display in the area where the reflection region is formed passes through the color filter twice and light for display in the area where the transmission electrode is formed passes through the color filter once, and wherein a value calculated by dividing a color reproduction range of the liquid crystal display device in reflection display by a color reproduction range of the liquid crystal display device in transmission display is 0.70 to 1.30, wherein the color reproduction range of the liquid crystal display device in the transmission display, when light of n colors emitted from the liquid crystal display device is shown as chromaticity coordinates (x, y) of n points on a chromaticity diagram of a CIE 1931 standard colorimetric system under conditions of the backlight source and a light receiving angle of 2°, being defined by an area of a polygon having the n points as vertexes, and the color reproduction range of the liquid crystal display device in the reflection display, when light of n colors emitted from the liquid crystal display device is shown as chromaticity coordinates (x, y) of n points on a chromaticity diagram of a CIE 1931 standard colorimetric system under conditions of a diffusion irradiation light without the backlight source and a light receiving angle of 2°, being defined by an area of a polygon having the n points as vertexes.

9. A liquid crystal display device comprising:
a backlight source;
a semi-transmissive film, disposed forward of the backlight source, for transmitting light from the backlight source and reflecting light made incident from a front face; and
a color filter, disposed forward of the semi-transmissive film, for transmitting light passing through the semi-transmissive film, light made incident from the front face, and light reflected from the semi-transmissive film among the light made incident from the front face,
the color filter corresponding to one pixel and having a same configuration in the entire area of the pixel;
the color filter having a color reproduction range of 0.079 or more,
the color reproduction range, when light of n colors after passing through the filters of n colors is shown as chromaticity coordinates (x, y) of n points on a chromaticity diagram of a CIE 1931 standard colorimetric system under conditions of a $D_{65}$ light source and a visual field of 2°, being defined by an area of a polygon having the n points as vertexes; and wherein reflection display and transmission display are performed by only light having passed through the color filter; and wherein light for the reflection display passes through the color filter twice and light for the transmission display passes through the color filter once, and wherein a value calculated by dividing a color reproduction range of the liquid crystal display device in the reflection display by a color reproduction range of the liquid crystal display in the transmission display is 0.70 to 1.30, wherein the color reproduction range of the liquid crystal display device in the transmission display, when light of n colors emitted from the liquid crystal display device is shown as chromaticity coordinates (x, y) of n points on a chromaticity diagram of a CIE 1931 standard colorimetric system under conditions of the backlight source and a light receiving angle of 2°, being defined by an area of a polygon having the n points as vertexes, and the color reproduction range of the liquid crystal display device in the reflection display, when light of n colors emitted from the liquid crystal display device is shown as chromaticity coordinates (x, y) of n points on a chromaticity diagram of a CIE 1931 standard colorimetric system under conditions of a diffusion irradiation light without the backlight source and a light receiving angle of 2° being defined by an area of a polygon having the n points as vertexes.

* * * * *